Feb. 10, 1942.　　　L. S. LONGENECKER　　　2,272,217
GLASS MELTING FURNACE
Filed June 29, 1940　　　3 Sheets-Sheet 1
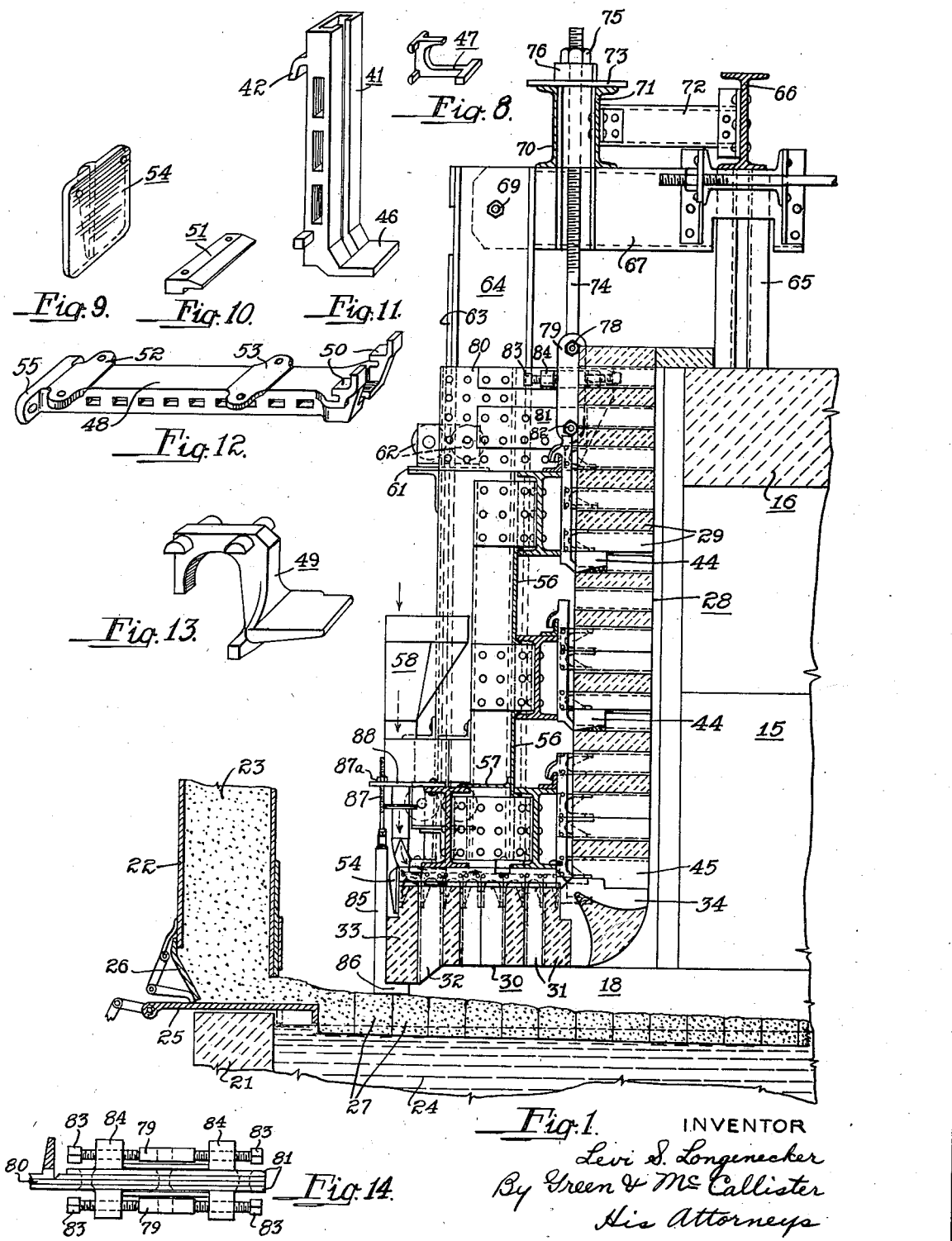
INVENTOR
Levi S. Longenecker
By Green & McCallister
His Attorneys Feb. 10, 1942.  L. S. LONGENECKER  2,272,217
GLASS MELTING FURNACE
Filed June 29, 1940  3 Sheets-Sheet 2
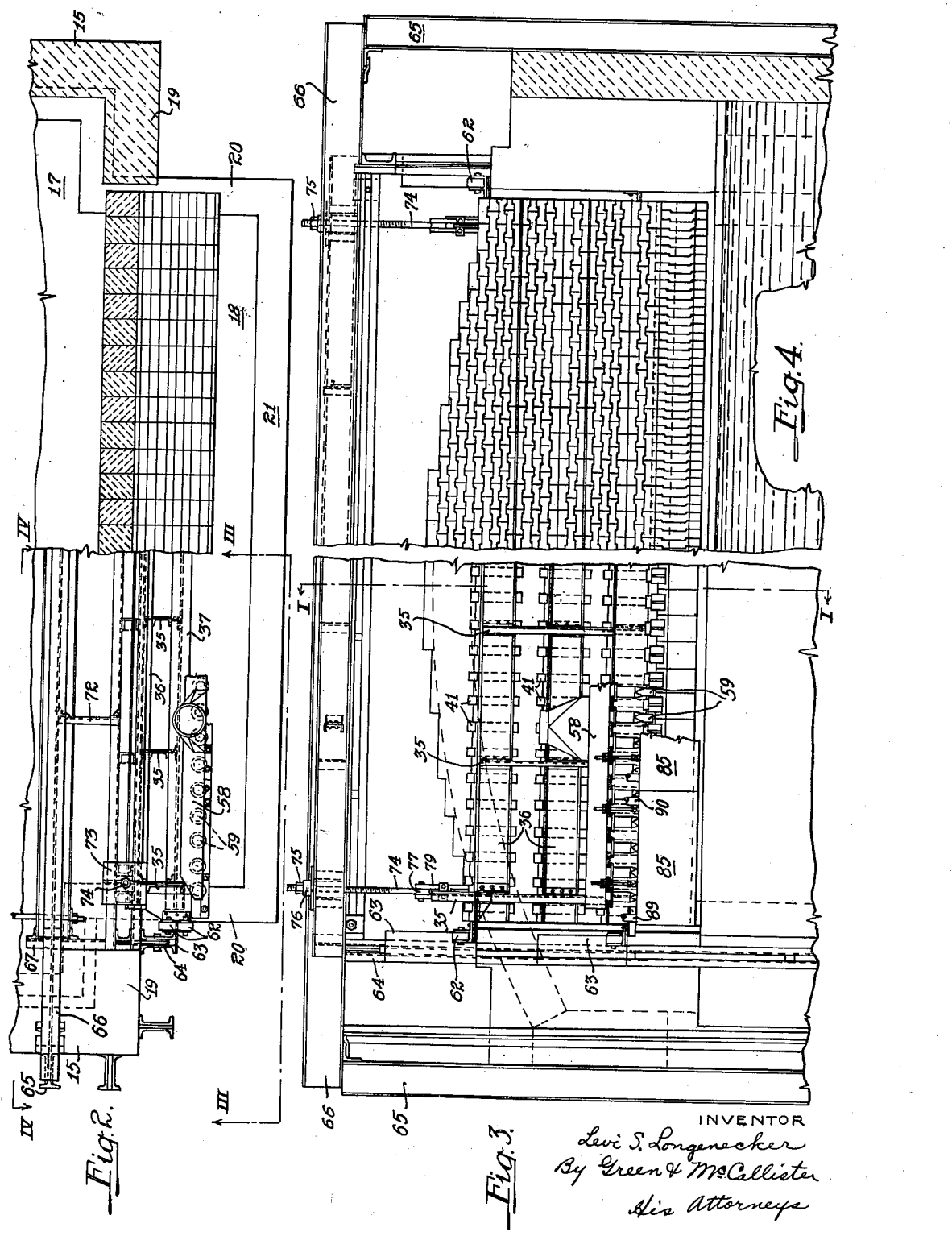
INVENTOR
Levi S. Longenecker
By Green & McCallister
His Attorneys

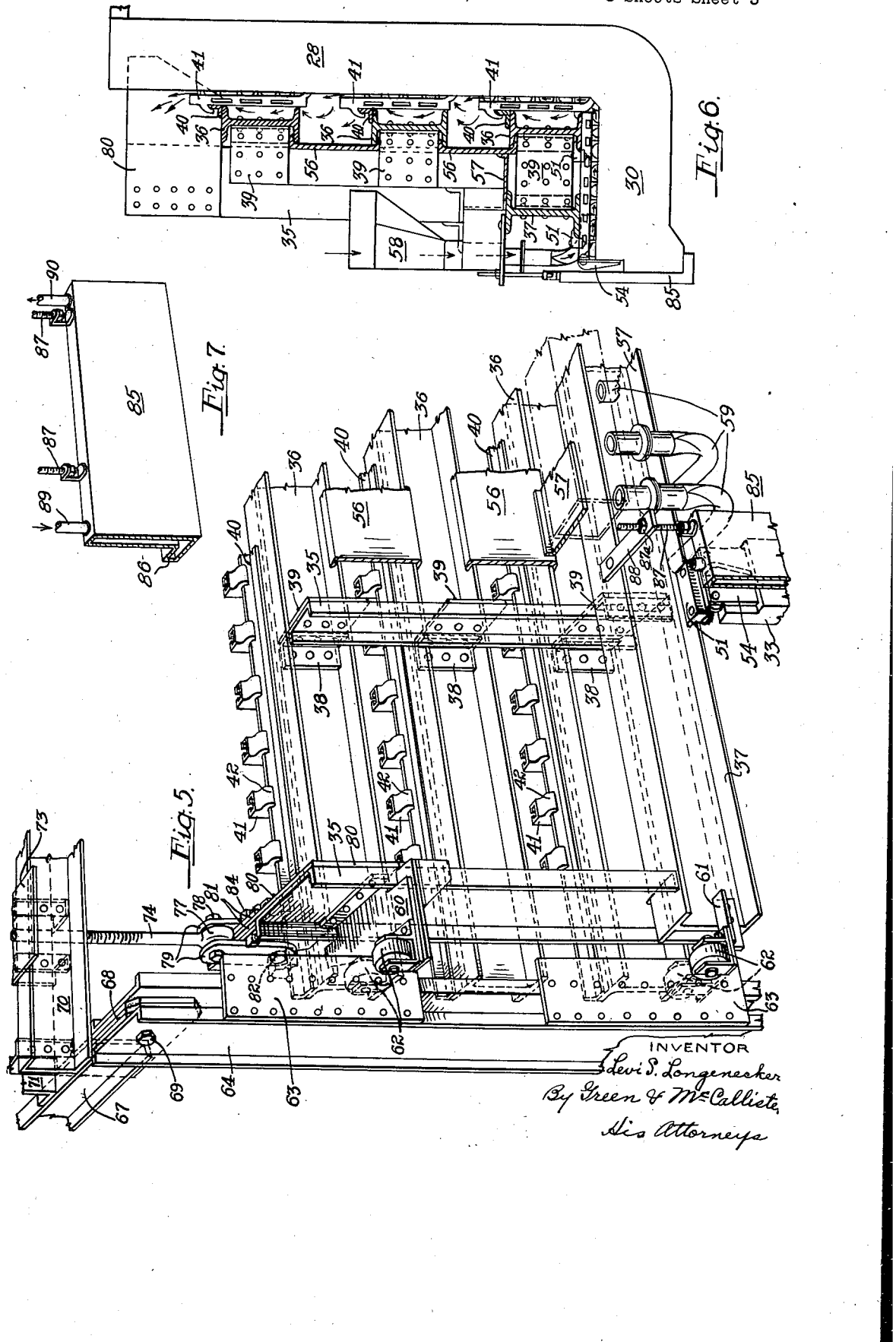

Patented Feb. 10, 1942

2,272,217

UNITED STATES PATENT OFFICE 2,272,217

GLASS MELTING FURNACE

Levi S. Longenecker, Mount Lebanon, Pa.

Application June 29, 1940, Serial No. 343,185

7 Claims. (Cl. 49—54)

This invention relates to continuous tank type furnaces for melting granular materials, among which are included granular glass batch material, and to the construction of the furnace end into which the granular material is fed.

Two applications filed jointly by H. L. Halbach, Walter G. Koupal, and William Owen and Serially Numbered 318,876 and 329,096 (hereinafter referred to as said joint applications) disclose continuous tank type glass melting furnaces, which, instead of the usual "dog house" at the material feeding end thereof, have the furnace tank at such end extended outwardly for an appreciable distance beyond the roof of the furnace heating chamber, so that the bath of molten glass at such end extends outwardly beyond the roof of the furnace heating chamber.

These applications also disclose a stationary wall for closing the end of the furnace heating chamber adjacent such tank extension, and which, terminating a short distance above the molten bath level in such tank extension, is provided with a horizontal portion which projects toward the outer wall of such tank extension to form a low level roof which covers a substantial portion of such extension. This low level roof, located as it is but a slight distance above the molten bath level, provides, in conjunction with the molten bath therebeneath a relatively long narrow slot through which the batch material may be fed into the tank proper.

These applications also disclose a method of and means for feeding granular batch material evenly onto the exposed surface of the molten bath within the tank extension.

The batch feeding means (several forms are shown) of these applications are so designed as to feed the granular batch or glass making material, uniformly onto the exposed surface of the molten bath within the tank extension, to form thereon a relatively thin layer or blanket of such material, which, beginning adjacent the outer wall of the tank extension, extends beneath the low level roof and into the tank proper where it is progressively melted.

This blanket, during its progress beneath said low level roof, and because of the nearness of said roof to the upper surface of the blanket and the high temperature at which the low level roof is maintained, has the particles of the granular material forming the upper portion thereof sintered or fritted together, so that no dust is carried from the blanket into the checkers by the flames as they sweep across the heating chamber.

One object of this invention is to produce a vertically adjustable wall for closing the material feeding end of the heating chamber of a tank type furnace in which the tank at such end extends outwardly or beyond the roof of the furnace heating chamber at such end.

Another object is to produce, for the material feeding end of a tank type furnace, a vertically adjustable wall which is supported independently of the walls and roof of the furnace.

Another object is to produce a vertically adjustable furnace wall for use in conjunction with the batch feeding method and means of said applications.

A still further object is to produce a furnace wall for use in conjunction with the batch feeding method and means of said applications, and which is so designed as to form therebeneath and within its confines, what may be termed a fritting or sintering chamber within which the granular particles forming the upper portion of the batch blanket, produced by said feeding means, are sintered or fritted together as such blanket moves therethrough on its way to the furnace chamber.

These, as well as other objects, which will be apparent to those skilled in this particular art, I attain by means of the structures described in the specification and illustrated in the drawings accompanying and forming part of this application.

In the drawings:

Figure 1 is a view partially in section and partially in end elevation of a vertically adjustable wall structure embodying this invention. This wall structure is shown in position at the material or batch feeding end of a continuous tank type glass melting furnace equipped with batch feeding means for carrying out the method of said joint applications; the furnace tank extension and batch feeding means being shown in section.

Fig. 2 is a view partially in top plan and partially in section of the structure shown in Fig. 1 with the batch feeding means omitted;

Fig. 3 is an elevational view of one half of the structure shown in Fig. 2 and with the batch feeding means omitted. This view is taken on line III—III of Fig. 2 and illustrates the outer side of the end wall of Fig. 1.

Fig. 4 is an elevational view taken on line IV—IV of Fig. 2 and illustrates one-half of the inner side of the end wall of Fig. 2;

Fig. 5 is a view in perspective of a portion of the metal framework entering into the construction of my end wall;

Fig. 6 is an end view partially in section and partially in elevation of the metal framework of Fig. 5 with the wall refractories diagrammatically shown in place. This view illustrates the means for cooling both the hanger and the refractories;

Fig. 7 is a perspective view of a water cooled bottom member which serves as the cover for the sealing lip forming part of my end wall structure;

Figs. 8 to 13 inclusive are perspective views of details of the refractory support means utilized in securing the refractories to the support frame of my end wall structure; and Fig. 14 is a top plan view of part of the wall aligning means.

In the drawings, 15 represents the side walls of the heating chamber of a continuous tank type glass melting furnace. 16 represents the roof of the heating chamber, 17 the tank proper, which is located beneath the heating chamber, and 18 an extension of the tank which projects outwardly beyond the roof of the heating chamber and the end walls 19 of said chamber. 20 represents the side walls of the tank extension and 21 the outer wall of said extension.

From the drawings and particularly from Fig. 2 thereof, it will be seen that extension 18 of the tank is but slightly less in width than the tank proper.

22 represents the hopper of a device for feeding granular batch or glass making material 23 onto the uncovered or exposed surface of the molten bath 24 within tank extension 18.

This feeding device is similar to the one disclosed in said application 329,096 and is provided with an intermittently operating pusher 25 and a pivotally mounted displacer plate 26. The feeding device is positioned above the outer wall 21 of the tank extension and is adapted to deposit onto the surface of the molten glass bath 24, increments 27 of a relatively thin blanket of the granular batch material.

Each increment of the blanket is of a length substantially equalling the width of the tank extension, or the distance between the end walls 20 of such extension, and each increment is of a width substantially equalling the length of each displacing movement of pusher 25.

It is to be understood that I make no claim to the batch or material feeding device nor to the method of feeding such material herein disclosed or as disclosed in either of said joint applications. My invention relates to the material feeding end of the furnace structure and the wall for closing such furnace end.

The wall included in my invention comprises a structure which is positioned above the tank extension and is supported independently of the furnace roof 16 and side walls 15. The wall comprises a vertically extending portion which as a whole is numbered 28 and which is made up of refractory blocks 29; a horizontally extending portion which, as a whole is numbered 30, and is made up of refractory blocks 31, 32 and 33 and a row or course of refractory nose blocks or tile 34 which connects said vertical and horizontal wall portions.

The vertical as well as the horizontal wall portions are made up of rows or courses of interlocking refractory blocks or tile such as broadly disclosed in United States Patent 1,590,303 issued to me on January 29, 1926, while the nose is preferably formed of interlocking refractory blocks or tile such as disclosed in United States Patent 1,977,799 issued to me on October 23, 1934.

The rows or courses making up the vertical and horizontal portions, as well as the row of blocks or tile forming the nose are carried by a metal frame such as clearly illustrated in the drawings (see particularly Fig. 5) and which, as has been pointed out, is supported independently of the furnace roof and side walls.

This frame is made up of a number of spaced vertically extending support members 35 of channel section and a number of vertically spaced and aligned horizontal support members 36 of I or H section, and an additional support member 37 of I or H section and which is horizontally spaced from the lowermost section 36. These vertically and horizontally extending sections are rigidly connected together by means of suitable angles and plates such as angles 38 and plates 39.

Each of the sections 36 has an angle 40 secured to the top thereof and this in effect forms an upwardly extending flange. Each such flange carries a row of brackets 41 (Fig. 11) which are suspended therefrom by means of hook-like projections 42.

Certain of the tile or blocks of the vertical wall portion, such as tile or blocks 44 and 45, are supported in place by the outwardly extending flange or foot portions 46 of said brackets 41, while the remaining blocks or tile forming the vertical wall portion are attached to brackets 41 by means of hanger members 47 (Fig. 8).

The tile or blocks forming the horizontal portion of the wall are carried by hangers such as 47 and these are secured within a bracket member 48 (Fig. 12). These in turn are secured to the lower beam 36 and beam 37. Each nose block or tile 34 is primarily held in place by a hanger member 49 which is secured to its bracket 48.

Each bracket 48 at one end is provided with inwardly projecting portions 50 which hook over the outer lower flange of the H or I beam section 36. The opposite end of bracket 48 is secured to the outer lower flange of I or H beam section 37 by means of a clip 51 (Fig. 10), which is bolted to a pad 52 formed adjacent one end of bracket 48. A similar clip, which lies over the inner lower flange of lower H or I beam section 36, is bolted to a similar pad 53 formed intermediate the ends of bracket 48.

Each block or tile 33 is held in place against outward movement by means of a stop plate 54 (Fig. 9) which is bolted to a pad-like projection 55 formed at the outer end of bracket 48.

The gaps or spaces between the adjacent outer flanges of beams 36 are closed by cover plates 56 and the space or gap between the lowest beam 36 and beam 37 is closed by means of a cover plate 57. These cover plates in combination with the horizontal beams 36—36—36—37 form an air channel between the support frame and the inner faces of the refractories forming the wall portions, as indicated by arrows in Fig. 6.

A wind box 58 adapted to be connected to a source of supply of cooling air under pressure is carried by the frame structure and is provided with a row of outlet nozzles 59 for leading the cooling air from the wind box to the space between bracket members 48, and the upper faces of the tile or blocks forming the horizontal portion of the wall. This is clearly shown in Figs. 1 and 6.

The frame structure at each end is provided with an upper support 60 and a lower support 61 and each of these supports carries a pair of guide rollers 62. The guide rollers of each pair bear against opposite sides of a plate 63, thus assisting in preventing the end wall structure from tilting.

These plates 63 are secured to buckstays 64 which are located adjacent the junction of the outer surfaces of end wall portions 19 of the heating chamber and side wall portions 20 of the tank extension.

Buckstays 65 positioned on opposite sides of the furnace chamber adjacent the tank extension are connected together by means of an I beam 66, and buckstays 64 and I beam 66 are tied together by means of a tie made up of channels 67 and plate-like members 68 which are located between the channel sections of buckstays 64, and to which they are bolted by means of bolts 69. Channel sections 67 carry spaced channels 70 and 71 and these in turn are tied to I beam 66 by means of tie members 72. Channels 70 and 71 are spaced apart and have mounted thereon plates 73 which are pierced to loosely receive threaded adjusting and supporting screw rods 74. Adjusting nuts 75 threaded to receive said rods, bear on anti-friction bearings 76 which are interposed between said nuts and plates 73.

The lower end of each threaded rod 74 is provided with an eye 77, and a bolt 78 which passes through said eye secures its rod 74 to the upper end of spaced links 79. These links straddle a plate 80 and spacers 81 secured to end support channel 35, and are pivotally connected to said plate and spacers by a pivot bolt 82. The metal framework of my end wall is thus supported independently of the furnace roof and side walls and is capable of being adjusted to different vertical positions.

Aligning screws 83 carried by blocks 84 attached to plate 80 and spacers 81, have their inner ends bearing against the edge faces of links 79 and these screws are utilized in positioning rods 74 so that said rods will be in line with the center of mass of the wall structure.

Tile or blocks 33 which form the inner edge of the refractory portion of horizontal wall part 30 are longer than tile or blocks 31 and blocks or tile 32 are also longer than tile or blocks 31 and have their lower surface angled as shown in Fig. 1, so as to bridge the gap between the lower faces of tile 33 and the lower face of the outermost tile 31. These two rows or courses comprising block or tile 33 and block or tile 32, form a downwardly depending lip for the outer edge of the horizontal portion of my end wall.

A series of hollow metal L-shaped members 85, shown in more or less detail in Fig. 7, have their lower leg 86 located below the lower faces of the blocks 33. Each of these hollow L-shaped members is supported for vertical adjustment independently of the wall, by means of two spaced vertically extending adjustment and support screws 87 which pass through support plates 88 attached to beam 37 and are held in adjusted position by means of nuts 87a.

Each of these L-shaped members is provided with an inlet pipe 89 and an outlet pipe 90 and these pipes are adapted to be connected to a source of supply of cooling water, so that cooling water is continually fed therethrough. These water cooled members, in reality form the lip of the horizontal portion of my end wall structure and blocks 32 and 33 serve as refractory barriers for protecting said members from the flames.

The horizontal portion of my end wall constitutes a low level roof for the major part of the tank extension.

For normal operation of the tank type furnace equipped with my end wall structure, the position of said wall will be so adjusted by adjustment nuts 75 that the lower faces of the L-shaped water cooled members 85 contact with increments 27 of the blanket as they are moved therebeneath and toward the tank proper so as to prevent any flame sting out.

The heat radiated by the horizontal portion of my end wall (which is maintained at a high temperature by the flames within the furnace chamber) serves to frit or sinter together the upper particles of granular batch material forming the blanket. This occurs as the blanket progresses toward the furnace heating chamber so that by the time the blanket reaches such chamber, it is in proper condition to receive the fuel flames without the danger of agitating the particles forming its seat and raising dust therefrom.

As I have said, the fritting or sintering chamber is formed by the horizontal portion 30 of my end wall and its outer lip or downwardly extending flange formed by tiles or blocks 32 and 33 and the water cooled L-shaped member which is vertically adjustable independently of the wall. The chamber in reality is formed by this horizontal wall portion and the molten bath extension located therebeneath.

I prefer to adjust the vertical height of the wall so that the under face of the fritting chamber will radiate sufficient heat to efficiently frit or sinter together the particles forming the entire upper surface of the blanket as it moves through said chamber.

My belief is that the lower face of the fritting chamber roof should not be more than fifteen inches above the surface of the molten glass bath therebeneath. The actual distance, of course, will depend upon the thickness of the blanket and, ordinarily the distance between the surface of the glass bath and said roof, will be from six to eight inches.

The degree of fritting or sintering accomplished in the fritting chamber will depend not only on the height of the chamber, but on the length of the chamber as well, that is, the distance between the water-cooled L-shaped members and the nose of my end wall, as well as the speed with which the blanket is moved through the fritting chamber. The speed of travel of the blanket will, of course, depend upon the amount of glass being withdrawn from the glass tank. It is, however, advisable to vary the height of the fritting chamber in accordance with the speed of movement of the blanket and the thickness of the blanket.

In case of a layover, my end wall may be lowered, if desired, so as to prevent any flame sting out and as I have said before, the lower legs of the water-cooled L-shaped members contact with the blanket increments moving therebeneath and thus prevent flame sting out during normal operation of the batch feeding means.

Having thus described my invention, what I claim as new and desire to secure by Letters Patent is:

1. In a furnace for melting granular material and having a heating chamber, a tank below said chamber for containing a molten bath of such material and having an extension for receiving the granular material to be melted and which projects outwardly beyond the roof of said chamber, a wall extending across said tank extension and which comprises a vertical section, and a horizontal section which joins said vertical section, extends outwardly away from the heating chamber and forms a low level roof for the major part of the tank extension; the construction and arrangement of said wall being such that its horizontal section is maintained at a sufficient temperature by the flames within the heating chamber to occasion fritting or sintering of the upper portion at least of the granular material supported by the molten bath therebeneath before said material is moved into the heating chamber.

2. In a furnace for melting granular glass making material and having a heating chamber, a tank below said chamber for containing a molten glass bath, and which extends outwardly beyond the heating chamber at the material receiving end of the furnace and is of substantially the same width as that portion of the tank below the heating chamber, a wall which extends across said tank extension and comprises a vertical section and a horizontal section which joins said vertical section, extends outwardly away from the heating chamber and forms a low level roof for the major part of the tank extension; the construction and arrangement of said wall being such that its horizontal section is maintained at a sufficient temperature by the flames within the heating chamber to occasion fritting or sintering of the upper portion at least of the granular material supported by the molten bath therebeneath before said material is moved into the heating chamber.

3. A wall as defined in claim 1 and which is supported independently of the furnace roof and side walls.

4. A wall as defined in claim 1 and which is supported independently of the furnace roof and side walls, in combination with means for adjusting the same vertically to vary the distance between the lower face of its horizontal section and the surface of the bath within the tank extension.

5. A wall as defined in claim 1 and which at the outer end of its horizontal section is provided with a depending lip which extends across the same from side to side.

6. A wall as defined in claim 1, and which at the outer end of its horizontal section is provided with a vertically adjustable water cooled member.

7. A wall as defined in claim 1 and in which its vertical and horizontal sections are formed of refractory blocks supported from a metal structure by means of hangers which are attached to certain of said blocks, and means for circulating cooling air between said blocks and said metal structure.

LEVI S. LONGENECKER.